United States Patent
Friedrichsen et al.

[15] 3,656,914
[45] Apr. 18, 1972

[54] FILLED REACTION TUBE PROVIDED WITH TEMPERATURE SENSORS

[72] Inventors: Wilheim Friedrichsen; Guenter Poehler; Gert Goeschel, all of Ludwigshafen; Gerhard Schaefer, Limburgerhof, all of Germany

[73] Assignee: Badische Anilin- & Soda-Fabrik Aktiengesellschaft, Ludwigshafen, Rhine, Germany

[22] Filed: Mar. 13, 1970

[21] Appl. No.: 19,420

[30] Foreign Application Priority Data

Mar. 15, 1969 Germany............................P 19 13 267.3

[52] U.S. Cl..............................23/288 M, 73/341, 138/111
[51] Int. Cl......................B01j 9/04, G01k 1/08, G01k 1/14
[58] Field of Search...................73/340, 341, 342, 343 R; 23/288, 288 H, 288 J, 288 K, 288 L, 288 M, 289, 253 A, 252, 283, 284, 1, 1 B, 277; 165/11; 138/111, 113, 178; 196/110, 133

[56] References Cited

UNITED STATES PATENTS

| | | | |
|---|---|---|---|
| 3,334,973 | 8/1967 | Goren et al. | 23/253 R |
| 2,148,706 | 2/1939 | Morrow | 73/343 |
| 3,172,832 | 3/1965 | Dreyer et al. | 23/288 X |
| 1,851,999 | 4/1932 | Black | 23/288 M UX |
| 1,890,435 | 12/1932 | Krauch et al. | 23/288 UX |

FOREIGN PATENTS OR APPLICATIONS 385,781   1/1933   Great Britain...........................23/289

*Primary Examiner*—Joseph Scovronek
*Attorney*—Johnston, Root, O'Keeffe, Keil, Thompson & Shurtleff

[57] ABSTRACT

A catalyst-filled reaction tube provided inside with several temperature sensors, and the insertion of electric leads and their protecting tubes in axial recesses in the tube wall (which may be homogeneous or consist of several layers) without making holes in the tube wall.

5 Claims, 4 Drawing Figures

A-B

INVENTORS:
WILHELM FRIEDRICHSEN
GUENTER POEHLER
GERT GOESCHEL
GERHARD SCHAEFER

C-D

INVENTORS:
WILHELM FRIEDRICHSEN
GUENTER POEHLER
GERT GOESCHEL
GERHARD SCHAEFER
BY
Johnston, Root, O'Keeffe, Keil, Thompson & Shurtleff
ATT'YS

FILLED REACTION TUBE PROVIDED WITH TEMPERATURE SENSORS

The invention relates generally to tubes and tube bundles provided with temperature measuring devices, and in particular to temperature sensors in catalyst-filled tubes which are surrounded by a corrosive medium.

It is known from "Chemie-Ingenieur-Technik," 1964, page 327 ff., for measuring the axial distribution of temperature in a packed column through which a gas-stream is being passed, to distribute a large number of temperature sensors over the length of the column and additionally, in specific cross-sectional planes of the packed column, to arrange several temperature sensors at different distances from the tube walls to determine the temperature distribution over the cross-section of the tube.

Thermocouples may be used as temperature sensors; their hot junctions located inside the tube, that is to say on the inner surface of the tube wall. The protection tubes of the thermocouples are situated on the outside of the tube, so that the protecting tubes are introduced radially through holes in the tube wall, which are plugged by thermocouple holders (made of special material), asbestos packing and clamping means.

In the carrying out of strongly exothermic or endothermic catalytic reactions in tubular reactors, the tubes filled with catalysts are surrounded by a special heat-transfer medium, in special processes for example with a salt melt. Commercial tubular reactors may have five to 15,000 catalyst tubes.

In reactors which require an exact temperature regime or when using heat-sensitive catalysts, it is particularly important to know exactly the temperature in the catalyst layer, so as to control the reactor in respect of the optimum supply of heat-transfer medium surrounding the tubes, and to be able to maintain the temperature within narrow limits. It is already known to provide one or more catalyst-filled tubes of a reactor with thermocouples, to the junctions of which the thermoelectric wires run in impact-resistant reinforced protecting tubes which are arranged in the region of the axis of the reactor tube. It has been found that accurate temperature measurement is not possible owing to the fact that measuring tubes, in contrast to normal tubes, are filled with correspondingly smaller amounts of catalyst and owing to the fact that the catalyst is distributed differently around the sensor protecting tube.

If one selects measuring tubes of greater diameter to compensate for the difference in quantity of the catalyst, the resultant different cross-sectional distribution of the catalyst does not give temperature values comparable with those in a normal tube either.

Moreover, radial introduction of the sensor protection tubes through the wall of the tube is not feasible, because this does not ensure permanent and secure closure of the necessary wall openings on account of the salt-melt which surrounds the tubes and serves as heat-transfer medium.

It is an object of this invention to provide with temperature sensors a reaction tube to be filled with replaceable catalyst so that the measured values accurately reflect the temperature distribution in tubes not provided with sensors and to do this without perforating the tube walls.

This object is achieved in accordance with this invention by arranging the leads to the temperature sensors in substantially axial recesses in the inner wall of the tube and arranging the hot ends of the leads so that they protrude substantially radially from the recesses towards the axis of the tube to reach predetermined measuring points located in the free cross-section of the tube, the depth and width of the recesses in the tube being at least equal to the diameter of the sensor protecting tube so that the entire free cross-section of the tube is, apart from the protruding ends, available for receiving the catalyst charge.

According to another embodiment of the invention such a catalyst tube is double-walled and has been made in several stages. In the outer wall of the inner tube, slots are milled running from the end of the tube to the region of the measuring plane advantageously in a longitudinal direction and, in which the sensor protection tubes are inserted, and this inner tube provided with the temperature sensors is inserted into an outer tube, with or without an intermediate bonding layer.

Further features will be evident from the following description with reference to the drawings.

Figure 1:
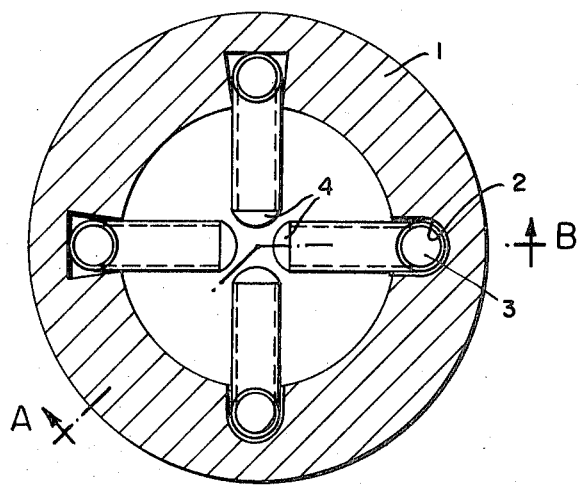
FIG. 1 shows the design of a homogeneous or one-walled reaction tube in cross-section, and FIG. 1a the corresponding longitudinal section along the line A–B.
Figure 1A:
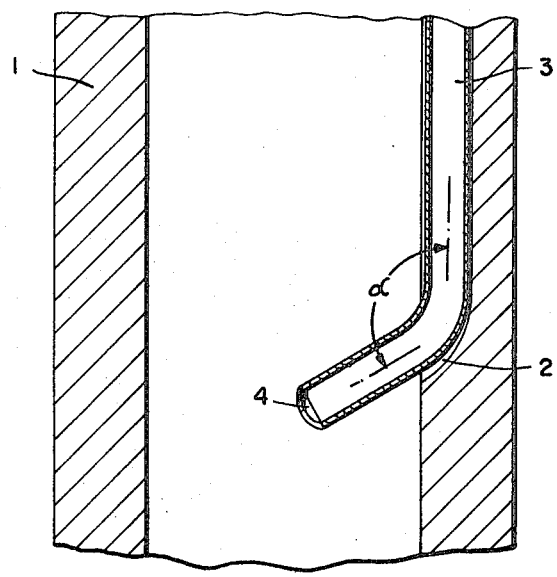

To avoid changing, over major axial regions, the tube cross-section available for the catalyst charge in the tube and to ensure even distribution of the catalyst particles, axial grooves 2 are milled in the walls of the tube, for accommodating temperature sensors, the depth and width of these grooves being at least as great as, and preferably greater than, the diameter of the sensor protecting tubes 3. The breadth of the grooves near the inner wall of the tube may be smaller than that near the bottom of the grooves. They may have a partly rounded, e.g., half-round, cross-section or have undercut edges or a trapezium-shaped cross-section formed by a dovetail groove cutter. After insertion of the sensor protecting tubes into these grooves, the edges of the grooves can be shaped by means of a tool inserted under pressure into the interior of the tube so that they keep the protecting tubes in position. It is also possible to fix the protecting tubes in the grooves by spring-loaded rings forced into the interior of the reaction tube. In the simplest case the recesses 2 are prepared over the whole length of the tubes during manufacture of the latter. It is preferred, however, that they extend from one end of the tube to not further than the region of the plane of the respective temperature sensor. In the region of this measuring plane, the free ends of the temperature sensors (the hot junctions in the case of thermocouples) together with the protecting tube are bent out of the recesses 2 towards the axis into the free cross-section of the tube preferably to make an angle $\alpha$ of 100° to 150° C with the direction in which the catalyst particles are subsequently introduced (see FIGS. 1a and 2a).

Figure 2:
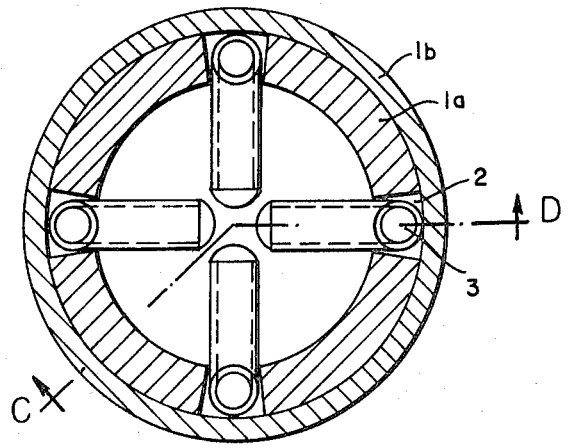
FIGS. 2 and 2a show the corresponding sections of a double-walled reaction tube.
Figure 2A:
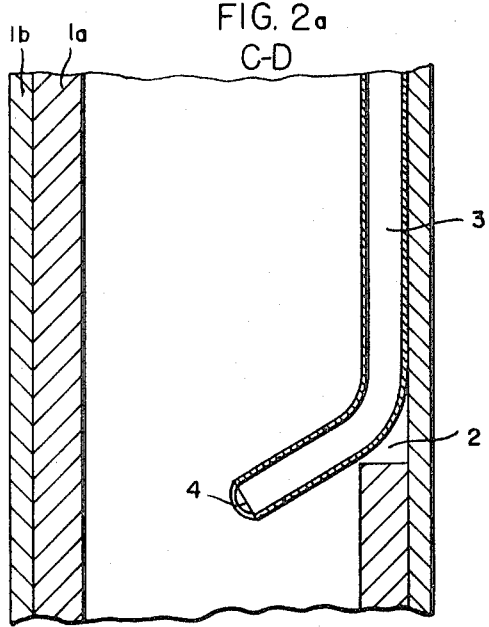

In the arrangement using double-walled tubes illustrated in FIGS. 2 and 2a, the grooves 2 extend right through the thickness of the inner tube, running from the end of the tube to the region of the desired plane of measurement. In the cloven inner tube 1a the set of temperature sensors is inserted and wedged in position by support members or soft metal. Then the outer tube 1b which has been heated to a temperature higher than the highest reaction temperature in use, is fitted over the inner tube so that it shrinks tightly onto the latter.

In a modified method of preparing such a tube heat conduction through the walls of the tube can be improved simply by laying on, or wrapping around, the inner tube 1a a sheet of readily fusible metal, over which the outer tube is drawn. By heating the two tubes to a temperature above the melting point of the metal of the interlayer, a good heat-conducting bond is obtained. Finally, it is also possible to make an intimate connection between the two tubes of the double-walled tube, before bending up the measuring ends (hot junctions) of the temperature sensors out of the grooves, by means of expanding the inner tube, e.g., by forcing a sphere or other body through it.

With the reaction tubes described above it is possible to monitor the course of the temperature right inside the catalyst charge of large-scale tubular reactors, for example in reactors with a marked hot spot which can arise for example during the oxidation of various hydrocarbons such as o-xylene or naphthalene.

We claim:

1. In a reaction tube for a tubular reactor containing a catalyst packing and being provided with temperature sensors arranged in the interior of said packing, said sensors being located at points which are distributed at intervals over the length of the reaction tube with their measuring ends being located at a predetermined distance radially inwardly from the inner wall of the reaction tube, the improvement of electrical leads to each temperature sensor enclosed within a sensor protecting tube which is attached to an axial recess running along the wall of the reaction tube with the hot ends of the leads together with said sensor being arranged to protrude from said recess towards the axis of the reaction tube to reach the predetermined measuring point in the free cross-section of the reaction tube.

2. A reaction tube according to claim 1 in which the depth and width of the recesses in the wall of the reaction tube are at least equal to the diameter of the sensor protecting tube.

3. A reaction tube according to claim 1 in which the width of the recesses increases in the direction from the inner towards the outer wall of the reaction tube.

4. A reaction tube according to claim 1 which is double-walled to provide an outer tube fitted over an inner tube with slots which run from one end of said inner tube only to the region of the measuring point in an axial direction, into which slots the protecting tubes of the temperature sensors are inserted.

5. A reaction tube according to claim 4, wherein said outer tube is bonded to said slotted inner tube by a heat-conducting interlayer having a significantly lower melting point than the material of the inner tube.

* * * * *